June 4, 1963   H. L. MILLER   3,092,237
CONVEYOR ARRANGEMENT
Filed March 6, 1961   2 Sheets-Sheet 2
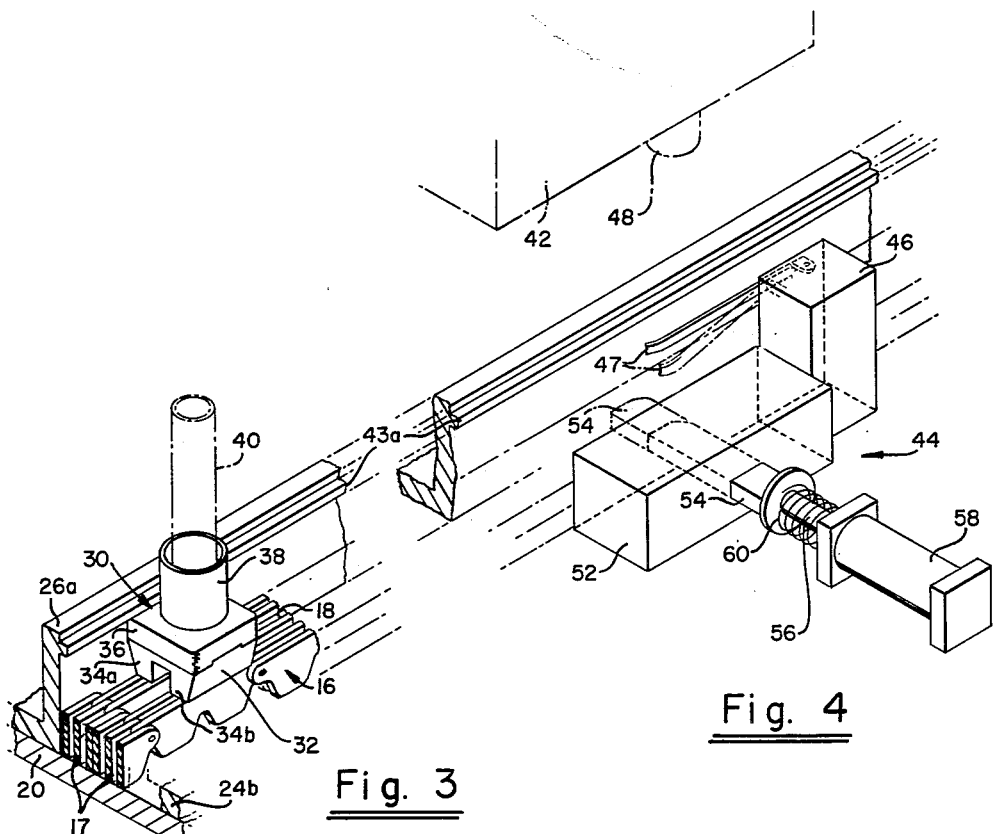
Fig. 3
Fig. 4
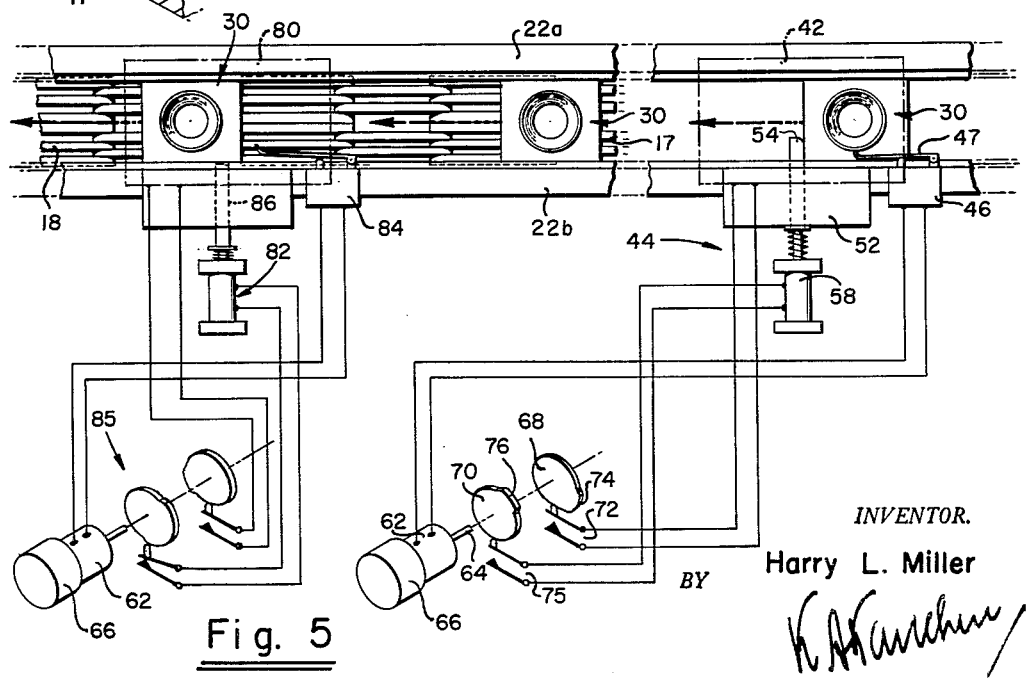
Fig. 5
INVENTOR.
Harry L. Miller
BY

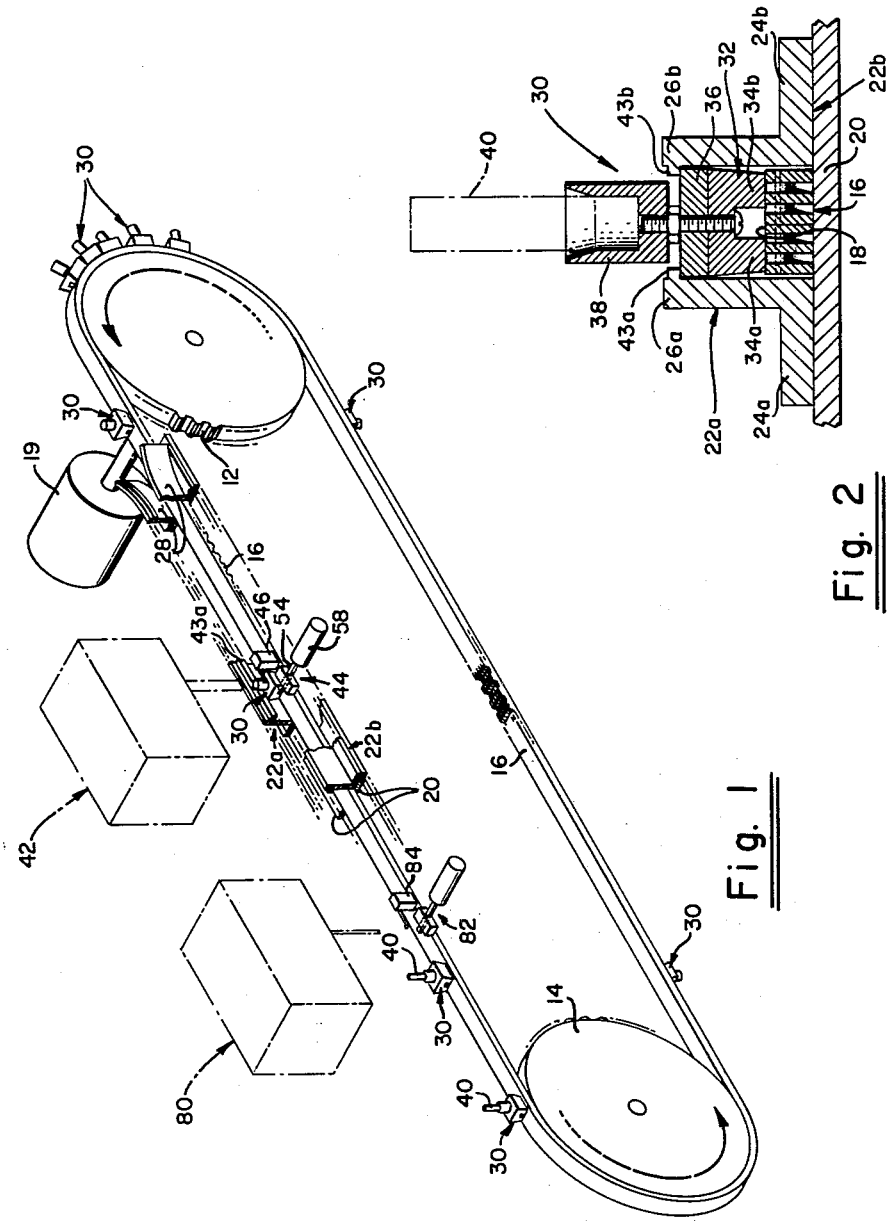

United States Patent Office 3,092,237
Patented June 4, 1963

3,092,237
CONVEYOR ARRANGEMENT
Harry L. Miller, Sausalito, Calif., assignor to Ways & Means, Inc., Sausalito, Calif., a corporation of California
Filed Mar. 6, 1961, Ser. No. 93,417
3 Claims. (Cl. 198—19)

The present invention relates to conveyor arrangements such as are used in connection with automatic production lines to carry a procession of articles to consecutive processing stations at each of which an operation is automatically performed upon the article. For instance, a procession of containers, such as bottles or cans, may be carried in succession to a station where they are filled, from there to another station where they are closed, and from there to yet another station where they are labeled. Since whatever operation is performed upon the articles at these stations requires a certain amount of time, it is either necessary, whenever an article has arrived at a processing station, to arrest the conveyor for the period of time required to perform the operation, or to arrange for the processing station to move congruently with the conveyor for the time necessary to perform the operation and then to return to its initial position so as to commence operation on the directly succeeding article. When the former method is employed, the production process is termed an "intermittent" one, while the latter is termed a "continuous" production process.

Both these automatic production processes have their disadvantages. While the equipment for intermittent operation is usually of a simpler construction and represents a smaller investment than the equipment for continuous operation, intermittent operation is relatively slow and the necessity of bringing heavy conveyors to a halt and to start them up anew in an endless sequence is power-consuming and subjects the equipment to heavy wear, which necessitates frequent repair and exchange of worn parts. The equipment for continuous production processes, on the other hand, is usually very complex, it requires often at every processing station a series of individual processing units which move on turrets or on separate endless conveyors in synchronism with the means for conveying the articles to be processed from station to station.

It is an object of my invention to provide an automatic production line that combines the advantages of the intermittent production processes with the advantages of the continuous production processes while eliminating most of the disadvantages of either.

More particularly, it is an object of my invention to provide an automatic production line that combines a continuously operating conveyor with stationary processing stations.

These and other objects of the present invention will be apparent from the following description of the accompanying drawings which illustrate a preferred embodiment thereof and wherein FIGURE 1 is a fragmentary and partly schematic perspective of an automatic production line embodying my invention;

FIGURE 2 is a cross section through the upper horizontal run of the conveyor illustrated in FIGURE 1;

FIGURE 3 is a perspective of a carrier element which is used in connection with the conveyor shown in FIGURE 1;

FIGURE 4 is a fragmentary and partly schematic perspective of one of the processing stations shown in FIGURE 1; and FIGURE 5 is a diagram illustrating the manner in which operation of a processing station is initiated by arrival of a carrier element underneath the station and the manner in which the carrier element is allowed to proceed on the conveyor after the station has completed its operation.

In accordance with my invention the articles to be processed are carried from station to station upon a continuously operating conveyor belt of a magnetizable material such as steel, by means of magnetic carrier elements that adhere to the belt with a predetermined degree of magnetism, and at the processing stations these carrier elements are temporarily arrested by means of retractable barriers which hold the carrier elements within the processing stations as the articles carried thereon are processed in said stations and while the conveyor belt continues to advance; and when the operation at a particular processing station has been completed, the barrier is automatically withdrawn so that the continuously moving conveyor belt may again take control of the carrier element by means of its magnetism and deliver the article to be processed to the next processing station.

Having first reference to FIGURE 1, the arrangement of the invention comprises a conveyor 16 formed by a drive sprocket 12 at its feed end and an idler sprocket 14 at its discharge end, and trained around said sprockets is an endless chain belt 16 of closely intertwined links 17 as shown in FIGURES 2 and 3. Said links are made from magnetizable material such as steel, and they form a smooth external belt surface 18. During operation of the conveyor the drive sprocket is continuously driven from a suitable motor indicated at 19 (FIGURE 1). The upper horizontal run of the belt is supported upon and slides along a smooth table 20, and arranged at either side of said run are guide members 22a and 22b that may be formed by angle bars which are preferably made of non-magnetic material, such as aluminum. The horizontal flanges 24a and 24b of said angle bars rest upon and are bolted to the table 20 while the vertical bars 26a and 26b thereof constitute the actual guide surfaces as best shown in FIGURE 2. At the feed end of the conveyor said guide members may be flared outwardly as shown at 28 in FIGURE 1, to form a receiving funnel for the articles to be conveyed along the upper horizontal run of the conveyor.

In order to convey articles by and upon the conveyor belt 16, I provide detachable carrier elements 30 shown in greater detail in FIGURES 2 and 3. Said carrier elements comprise a small permanent magnet 32 which may be of U-shaped cross-sectional contour, and which adheres to, and is carried along by, the steel belt 16 when the free ends of its shanks 34a and 34b are placed upon said belt. Mounted upon the back of each magnet is a small rectangular table plate 36 which fits snugly into the space defined by and between the vertical flanges of the angle bars 22a and 22b, and supported above said table plate is the means for holding the article to be operated on in the automatic production arrangement of the invention. The exemplary embodiment of the invention illustrated in the accompanying drawings is intended to fill small medical containers of tubular shape, and accordingly the table plate 36 of the carrier members mounts a cup 38 which is adapted to receive and hold a tubular container of the type illustrated in phantom lines at 40 in FIGURES 2 and 3.

In FIGURE 1 a sequence of the described carrier elements is shown as ascending the horizontal run of the conveyor. Upon entering the positioning funnel 28 formed by the guide members 22a and 22b at the entrance ends thereof, they are positioned accurately and positively upon the conveyor belt. As the conveyor belt advances, the carrier members approach the first station on the horizontal conveyor run. At said station each of them is to be provided with a container from a container feeding apparatus represented schematically by the block 42 in FIGURES 1, 4 and 5. When a carrier element on conveyor 16 moves underneath the container feeding apparatus 42, it encounters a barrier 44 that extends across the conveyor belt and which stops the carrier positively in exactly the proper position in which its cup 38 may receive a container 40 from the container feeding apparatus. The conveyor belt, however, continues to advance uninterruptedly since the magnetic force by which the carrier element adheres to the conveyor belt is not large enough to halt, or even retard the advance of the conveyor. To permit the conveyor belt to advance smoothly underneath the arrested carrier element, the shanks 34a and 34b of the carrier magnets 32 should have smoothly finished frontal surfaces.

To prevent tilting of the carrier elements about an axis longitudinally of the conveyor run, guide fillets 43a and 43b (FIGURES 1, 2 and 4) may be provided on the inner surface of the guide flanges 26a and 26b respectively, at a level at which the table plates 36 of the carrier elements may smoothly slide undereneath said fillets. Thus, while a carrier element is supplied with a container at station 42, it is dependably held in its proper position against the advancing conveyor by said fillets.

Arranged below one of the fillets 43a or 43b in the side wall of the respective guide flange 26a or 26b, as the case may be, is a normally open switch 46 whose actuating arm 47 (FIGURE 4) extends into the path of approaching carrier elements upon the belt 16, and as a carrier element approaches the barrier 44, it engages said actuating arm and closes the switch 46. Closure of switch 46 initiates a series of operations that set into motion the container feeding apparatus causing it to drop a container into the cup 38 on the carrier element when said carrier element is arrested by the barrier 44 with said cup precisely aligned with the feeding tube 48 of the container feeding station; and when the container released by the feeding apparatus has dropped into the cup 38, the operations initated by closure of switch 46 cause brief withdrawal of the barrier 44. When the barrier 44 is withdrawn, the magnetic attraction existing between the shanks 34a and 34b of the carrier element and the steel belt 16 is effective to carry said element 30 along with the continuously advancing conveyor belt and deliver it, with a container lodged in the cup 38, to the next processing station, whereat the container is to be filled with a medical fluid. Directly behind the released carrier element, the barrier 44 is again projected across the advancing conveyor run so that it may stop any succeeding carrier element in its proper container receiving position below the container feeder 42.

In the exemplary embodiment of the invention illustrated in the accompanying drawings and particularly FIGURE 4 thereof, the retractible barrier across the horizontal conveyor run is represented by a guide block 52 within which is slidably received a steel bar 54 that extends normally across the conveyor belt 16. The opposite end of said bar is attached to the normally projected armature 56 of a solenoid 58. When said solenoid is energized, it retracts the armature 56 against the urgency of a restore spring 60 and in this manner withdraws the bar 54 from across the advancing conveyor belt 16; and when the solenoid 58 is deenergized, the restore spring 60 projects said bar again across the conveyor belt 16.

Electric circuitry for controlling the operation of the container feeding apparatus 42 and of the retractable barrier in appropriately timed relation with each other will readily occur to those skilled in the art, but for sake of completeness, such a control circuit has been illustrated in its simplest form in FIGURE 5. In said FIGURE 5 closure of the normally open switch 46 whose actuating arm 47 extends in the path of a carrier element approaching the barrier 44, is arranged to engage a single cycle clutch 62 which connects a timing shaft 64 for a single revolution thereof to the output shaft (not shown) of a continuously operating timing motor 66. Mounted upon the timing saft are two disk cams 68 and 70. Arranged adjacent cam 68 is a normally open switch 72 which controls the power that sets into operation the container feeding apparatus 42; and when the clutch control switch 46 in the path of an approaching carrier element is closed as described hereinbefore, and the timing shaft 64 is coupled to the motor 66 for a single revolution, the cam 68 commences to turn; and a lobe or dwell 74 of appropriate angular width which is located directly behind the actuating arm of the switch 72 in the full cycle position of the timing shaft, is effective to close the said switch and keep it closed for the time necessary to complete the container feeding operation. The second cam 70 on shaft 64 is arranged to control a normally open switch 75 in the power circuit of the barrier-control solenoid 58. Said cam 70 has a dwell or lobe 76 which starts in rotary alignment with the end of the feeder control lobe 74 on cam 68. Thus, at the time when the container feeding operation is completed and a container has dropped in its proper position into, and is securely seated in the cup 38 upon the arrested carrier element, the dwell 76 on the second cam 70 closes the solenoid control switch 75, and the resultant energization of the solenoid 58 retracts the bar 54 for a sufficient time to allow the carrier element with the container nested therein to pass through the barrier. However, the angular length of the dwell 76 upon cam 70 is such that the solenoid is directly thereafter deenergized permitting the restore spring 60 to return the bar to its blocking position across the conveyor 16 so that any directly succeeding carrier element is likewise arrested in container-receiving position below the container feeding station 42.

Any number of processing stations may be arranged in properly spaced relation along the upper, and even along the lower, horizontal run of the conveyor 10 and the operation of every one of said stations may be controlled in an analogical manner with no necessity to establish any synchronism between the operation of the conveyor and the processing stations, or even between the individual processing stations themselves. In the exemplary embodiment of the invention illustrated in FIGURES 1 and 5, a filling station 80 is provided adjacent the horizontal conveyor run, and another retractable barrier is arranged across the conveyor below the filling station as indicated at 82; and the operation of the filling station is again initiated by closure of a normally open switch 84 in the path of the carrier elements. Closure of said switch again starts operation of a timing mechanism collectively identified by the reference numeral 85 in FIGURE 5, that establishes the proper sequence in the performance of the filling mechanism and the retraction of the bar 86 upon completion of the filling operation. Other processing stations (not shown) for closing and sealing the filled containers and for providing them with labels and transfering them into cartons may be arranged at the proper intervals along the upper and lower horizontal runs of the conveyor 16 and will effectively perform their functions upon the articles held in the carrier elements, without need to interrupt the advance of the conveyor or synchronize the advance of the conveyor with the operation of the processing stations. It should be noted that the articles to be processed are not delivered haphazardly from station to station, but are advanced positively and are dependably held in their proper position transversely of the conveyor surface without a possibility of tilting or twisting.

While I have described my invention with the aid of a particular embodiment thereof, it will be understood that the invention is not limited to the specific constructional details shown and described which may be departed from without departing from the scope and spirit of the invention.

I claim:

1. A conveyor arrangement for conveying an article to a processing station comprising a conveyor belt having a smooth surface and a rectilinear run, means for continuously advancing said conveyor belt, guide members at either side of said rectilinear run; a carrier element for the article to be conveyed having a magnet in the form of an inverted U, the shanks of said magnet having smooth frontal surfaces adapted for sliding contact with the smooth surface of said endless conveyor belt, a table plate mounted upon the back of said magnet and having smooth parallel side edges adapted for sliding contact with said guide members, and means for holding an article mounted upon said table plate; and a retractable barrier extending across said rectilinear run to positively bar temporarily further advance of said carrier element in a position wherein an article carried thereby may be properly operated on at said station while permitting the conveyor belt to continue its advance.

2. A conveyor arrangement for conveying an article to a processing station comprising an endless conveyor belt having a smooth outer surface and a rectilinear run, means for continuously advancing said conveyor belt, guide members at either side of said rectilinear conveyor run forming transversely spaced vertically disposed guide surfaces, a carrier element for the article to be conveyed having a magnet in the form of an inverted U, the shanks of said magnet having smooth frontal surfaces adapted for sliding contact with the smooth outer surface of said conveyor belt, a table plate mounted upon the back of said magnet and having smooth parallel side edges adapted for sliding contact with the guide surfaces of said guide members, and means for holding an article mounted upon said table plate; a retractable barrier extending across said rectilinear conveyor run to bar positively further advance of said carrier element with the continuously advancing conveyor belt in a position wherein the article carried thereby may be properly operated on at said station; and retaining fillets provided on said guide surfaces in front of said retractable barrier at a level directly above the table plate of said carrier element to engage the upper surface of said table plate and securely maintain said carrier element in its proper position upon the conveyor belt.

3. Arrangement for conveying an article to a processing station for operation thereon at said station comprising an endless belt of magnetizable material, means for advancing said endless belt continuously, a carrier element for the article to be conveyed having a magnet adhering detachably to said belt for conveyance therewith and mounted thereon means for holding an article, a retractable barrier extending across said belt to positively arrest advance of said carrier element on said belt in a position wherein an article held thereon may be operated on by the processing station as said belt continues its advance, means activated by a carrier element on said belt when approaching said barrier to set into operation said processing station and to retract briefly said barrier upon completion of the operation of said processing station so as to permit said arrested carrier element to resume its advance with said conveyor belt.

References Cited in the file of this patent
UNITED STATES PATENTS

| | | |
|---|---|---|
| 2,000,292 | Miller | May 7, 1935 |
| 2,609,915 | De Burgh | Sept. 9, 1952 |
| 2,740,515 | Wilson | Apr. 3, 1956 |
| 2,964,071 | Buell | Dec. 13, 1960 |